(12) United States Patent
Sood et al.

(10) Patent No.: US 9,871,823 B2
(45) Date of Patent: Jan. 16, 2018

(54) TECHNIQUES TO DELIVER SECURITY AND NETWORK POLICIES TO A VIRTUAL NETWORK FUNCTION

(71) Applicant: INTEL CORPORATION, Santa Clara, CA (US)

(72) Inventors: Kapil Sood, Beaverton, OR (US); Manuel Nedbal, Santa Clara, CA (US); Thomas M. Slaight, Beaverton, OR (US); Brian J. Skerry, Gilbert, AZ (US); Ren Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,063

(22) Filed: Dec. 23, 2014

(65) Prior Publication Data
US 2016/0182567 A1    Jun. 23, 2016

(51) Int. Cl.
*H04L 29/06* (2006.01)
*G06F 21/55* (2013.01)

(52) U.S. Cl.
CPC ............ *H04L 63/20* (2013.01); *G06F 21/554* (2013.01); *H04L 63/0272* (2013.01); *H04L 63/101* (2013.01); *H04L 63/104* (2013.01); *H04L 63/1441* (2013.01)

(58) Field of Classification Search
CPC ....................................................... H04L 63/20
USPC ............................................................ 726/1
See application file for complete search history.

(56) References Cited

U.S. PATENT DOCUMENTS

| | | | |
|---|---|---|---|
| 8,850,593 B2* | 9/2014 | Brandt | G06F 21/575 726/15 |
| 2013/0281058 A1 | 10/2013 | Obaidi et al. | |
| 2013/0345530 A1 | 12/2013 | McRoberts et al. | |
| 2014/0019745 A1* | 1/2014 | Dodgson | H04L 63/065 713/150 |
| 2014/0052852 A1 | 2/2014 | Dufour et al. | |
| 2014/0229945 A1 | 8/2014 | Barkai et al. | |
| 2014/0317261 A1 | 10/2014 | Shatzkamer et al. | |
| 2015/0381423 A1* | 12/2015 | Xiang | H04L 69/03 709/223 |

OTHER PUBLICATIONS

Provisional SPEC: 62/017,718—"System & Method for VNF Policy management", Xiang Jun. 26, 2014.*
International Search Report and Written Opinion received for PCT Patent Application No. PCT/US2015/062111, dated Feb. 29, 2016, 12 pages.

* cited by examiner

*Primary Examiner* — Longbit Chai
(74) *Attorney, Agent, or Firm* — Barnes & Thornburg LLP

(57) ABSTRACT

Examples may include techniques to securely provision, configure, and de-provision virtual network functions for a software defined network or a cloud infrastructure elements. A policy for a virtual network function may be received, at a secure execution partition of circuitry, and the virtual network function configured to implement the policy by the secure execution partition of the circuitry. The secure execution partition may connect to the virtual network function through a virtual switch and may cause the virtual network function to implement a network function based on the policy.

25 Claims, 10 Drawing Sheets

Cloud Infrastructure 100

TECHNIQUES TO DELIVER SECURITY AND NETWORK POLICIES TO A VIRTUAL NETWORK FUNCTION

TECHNICAL FIELD

Examples described herein are generally related to cloud systems and to providing security and network policies to virtual network functions of a cloud operating system.

BACKGROUND

Software defined infrastructure (SDI) or software defined network (SDN) is a technological advancement that enables new ways to operate large pools of configurable computing resources or configurable network resources deployed for use in a datacenter or as part of a cloud infrastructure. SDN may allow individual network elements of a system of configurable computing resources to be composed with software. In particular, with SDN, network functions may be virtualized to provide a virtual network function (VNF). VNFs may include, for example, firewalls, packets inspection, Network Operator's backbone systems like MME, PDN gateway or the like. These VNFs may be provisioned, deployed, executed, and deleted in an SDI.

DETAILED DESCRIPTION

As contemplated in the present disclosure, a software defined network (SDN) may allow individual network elements of a system of configurable computing resources to be composed with software. In particular, various network functions can be virtualized to provide a virtual network function (VNF). Current cloud infrastructure management tools lack an ability to securely and reliably deliver network and/or security policies to these VNFs.

According to some examples, techniques to deliver security and/or network policies to VNFs are provided. In particular, various examples provide a secure environment to deliver policies to VNFs. The secure environment can be out-of-band from the other components of the software defined infrastructure (SDI) and can be authenticated using third-party credentials. In general, a secure execution environment is utilized to dynamically and securely manage security and network policies for VNFs at provisioning, run-time, and de-provisioning.

Various examples of the present disclosure may be implemented in one or more specifications provided by the European Telecommunications Standards Institute (ETSI) and particularly in the network function virtualization (NFV) standards. For example, the present disclosure may be implemented in the ETSI NFV SEC 001—Security Problem Statement Specification 2014, the ETSI NFV SEC 003—Security and Trust Specification 2014, and/or the ETSI NFV MANO 001—Manageability and Orchestration Specification 2014.

Figure 1:
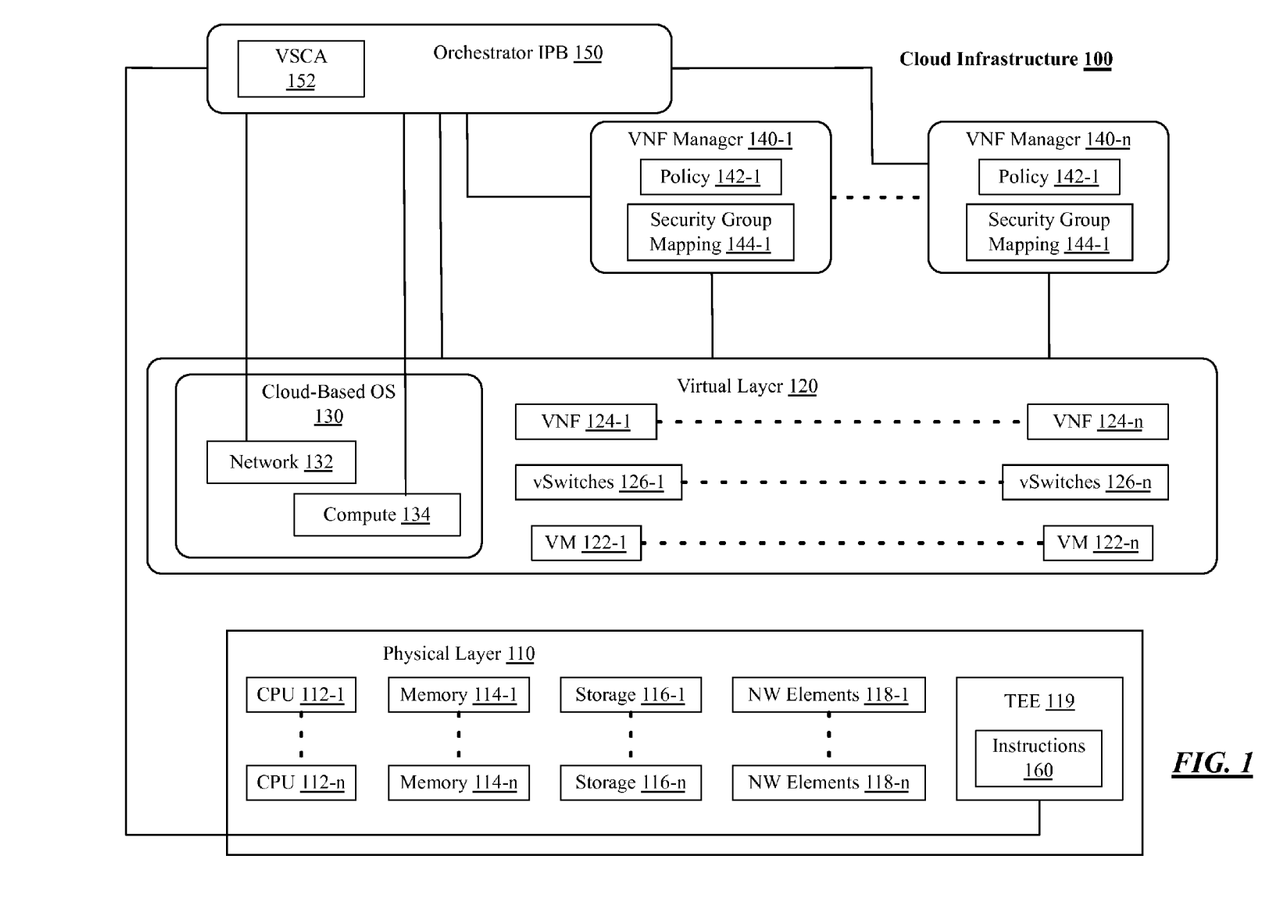
FIG. 1 illustrates an example cloud infrastructure.

FIG. 1 illustrates an example cloud infrastructure 100, arranged according to at least some embodiments of the present disclosure. In some examples, as shown in FIG. 1, cloud infrastructure 100 includes a physical layer 110 and a virtual layer 120. The virtual layer 120 may be implemented to provide virtual network functions (e.g., using the VNFs 124-1 to 124-n) within the cloud infrastructure 100. In particular, a variety of networks may be implemented within or by the cloud infrastructure 100, such as, for example, a data center network, service provider network, and/or a LAN. Portions of the network may be implemented within the virtual layer 120, such as, for example, by the VNFs.

In general, the virtual layer 120 operates using the computing resources of the physical layer 110. The physical layer 110 may be implemented in any of a variety of computing devices, such as, for example, servers, data centers, distributed computing systems, etc. The physical layer 110 may include CPUs 112-1 to 112-n, where "n" is any positive integer greater than 1. CPUs 112-1 to 112-n may individually represent single microprocessors or may represent separate cores of a multi-core microprocessor. The physical layer 110 may also include memory 114-1 to 114-n. Memory 114-1 to 114-n may represent various types of memory devices such as, but not limited to, dynamic random access memory (DRAM) devices that may be included in dual in-line memory modules (DIMMs) or other configurations. The physical layer 110 may also include storage 116-1 to 116-n. Storage 116-1 to 116-n may represent various types of storage devices such as hard disk drives or solid state disk drives. The physical layer 110 may also include network (NW) elements 118-1 to 118-n. NW elements 118-1 to 118-n may include network interface cards (NICs), switches, or the like having one or more NW ports for network connections for NWs within cloud infrastructure 100 or external to cloud infrastructure 100 and to route data via either internal or external network links for elements of cloud infrastructure 100.

Additionally, the physical layer 110 may include a trusted execution environment (TEE) 119. The TEE 119 may include a secure partition of circuitry within the physical layer 110. In some examples, the TEE 119 may be a partition within one or more of the CPUs 112-1 to 112-n. In general, the TEE 119 can comprise any number of secure execution partitions (e.g., Software Guard Extension (SGX), Intel® Manageability engine (IME), Innovation Engine (IE), or the like). It is noted, that the TEE 119 may execute instructions 160. The instructions 160 can comprise computer executable instructions, operative on the circuitry or processing component of the TEE 119 to cause the TEE 119 to perform the techniques described herein.

It is important to note, that with some examples, the TEE 119 may be implemented as a virtual secure execution partition. More specifically, the TEE 119 can be implemented in either the physical layer 110 or the virtual layer 120. Examples are not limited in this context. However, for purposes of clarity, the TEE is described as implemented in the physical layer, and can be, for example, circuitry including a secure execution partition implemented by ones of the CPUs 112-1 to 112-n.

Furthermore, it is noted, that the elements (e.g., CPUs 112-1 to 112-n, memory 114-1 to 114-n, etc.) can be grouped into logical arrangements to form, for example, a server grouping or server cluster upon which at least a portion of the virtual layer 120 may execute.

In general, the virtual layer 120 may abstract the hardware of the physical layer 110 to provide virtual computing resources. In particular, the virtual layer 120 may implement a virtual machine (VM) or a number of VMs that can be used to process any number or type of computing workloads. For example, the virtual layer 120 may include VMs 122-1 to 122-n, which can be implemented to perform email processing, web server processing, graphics processing, database processing, service provider traffic, or the like utilizing the computing resources of the physical layer 110.

The virtual layer 120 may also include VNFs 124-1 to 124-n to provide various network functions. For example, one or more of the VNFs 124-1 to 124-n may implement an intrusion prevention system (IPS), a firewall (FW), data loss prevention (DLP), load balancers, network accelerators, 3GPP Evolved Packet Core components (e.g., a mobile management entity (MME),) packet data network (PDN) gateway, or the like. Additionally, the virtual layer 120 may include a number of virtual switches (vSwitches) 126-1 to 126-n to provide connectivity between VMs 122-1 to 122-n, VNFs 124-1 to 124-n, other virtual containers (not shown), and/or other components of the cloud infrastructure 100. In particular, the vSwitches 126-1 to 126-n route data between elements of the virtual layer 120 and/or the physical layer 110.

A cloud-based operating system (OS) 130 may be included in the virtual layer 120. In general, the cloud-based OS 130 provides an execution environment for executing the workloads on the VMs 122-1 to 122-n. It is to be appreciated, that more than one cloud-based OS 130 may be implemented in the virtual layer 120. However, for purposes of clarity, only the cloud-based OS 130 is shown. The cloud-based OS 130 can include network portions 132 and compute portions 134. With various examples, the cloud-based OS 130 can be any of a number of operating systems configured to execute and/or operate on SDI. For example, the cloud-based OS 130 can be Openstack®, Cloud Stack®, VmWare®, WindRiver®, or the like). With some examples, the cloud-based OS 130 may be configured to use secure HTTP-based REST APIs. This is described in greater detail in the ETSI standards referenced above.

The cloud infrastructure 100 further includes VNF managers 140-1 to 140-n and an orchestrator intelligent placement broker (IPB) 150. In general, the VNF managers 140-1 to 140-n and the orchestrator IPB 150 can be configured to perform supervisory and management functions for VNFs 124-1 to 124-n. The orchestrator IPB 150 may include a virtual security controller agent (VSCA) 152. The VSCA 152 can comprise computer executable instructions operative to cause the infrastructure 100 to perform the techniques described herein. In particular, it is important to note, that the TEE 119 may execute portions (or all) of the orchestrator IPB 150, such as, for example, the VSCA 152. Said differently, in some examples, some operations of the orchestrator IPB 150 may be implemented to execute within the TEE 119. With some examples, the VSCA 152 may be implemented in the virtual layer 120.

The orchestrator IPB 150 may be communicatively coupled the VNF mangers 140-1 to 140-n, the cloud-based OS 130, and the TEE 119 to implement provision, configure, and de-provision the VNF's 124-1 to 124-n. Furthermore, the orchestrator IPB 150 may be communicatively coupled the VNF mangers 140-1 to 140-n, the cloud-based OS 130, and the TEE 119 to monitor and receive indications of state information of the VNFs 124-1 to 124-n and the VMs 122-1 to 122-n.

Furthermore, although not shown, the orchestrator IPB 150 may be connected to a service provider's or operator's operations support system (OSS) and business support system (BSS). It is noted, that the interactions and operation of the OSS and BSS with an orchestrator are described in greater detail in the ETSI standards referenced above.

With some examples, the orchestrator IPB 150, the instructions 160, and/or the VM managers 140-1 to 140-n can be operably connected to the cloud-based OS 130 (e.g., the network 132, the computer 134, or the like) and/or to other elements of the cloud infrastructure 100 to receive various information including indications of telemetry data, sensor data (e.g., thermal, power, or the like), data packets, network interface card information, etc.

The VNF managers 140-1 to 140-n may include policies 142-1 to 142-n and security group mappings 144-1 to 144-n. In general, the policies 142-1 to 142-n are security and/or network policies to be implemented by one or more of the VNFs 124-1 to 124-n. For example, the policies 142-1 to 142-n can be for any of a variety of network functions. Additionally, a vendor, manufacturer, or developer of the VNF to which the policy is to be applied can supply the policies 142-1 to 142-n. In particular, the policies 142-1 to 142-n may include vendor specific information (e.g., SIG files, policy engines, or the like). The present disclosure provides security for the vendor specific information, which may be proprietary, by utilizing the TEE 119 to provision, configure, and de-provision the VNFs 124-1 to 124-n and particularly to configure the VNFs 124-1 to 124-n to behave according to a specific network and/or security policy.

The security group mappings 144-1 to 144-n include listings or mappings of VMs 122-1 to 122-n to form security groups for a particular VNF 122-1 to 122-n. For example, the VNF 124-1 may be used to implement an IPS network function and can be configured to implement the IPS function based on the policy 142-1 and to protect ones of the VMs 122-1 to 122-n specified in the security group mapping 144-1.

In executing the instructions 160, the TEE 119 can provision ones of the VNFs 124-1 to 124-n, configure the VNFs to implement policies 142-1 to 142-n, and also configure the VNFs to protect ones of the VMs 122-1 to 122-n based on the security group mappings 144-1 to 144-n.

Figure 2:
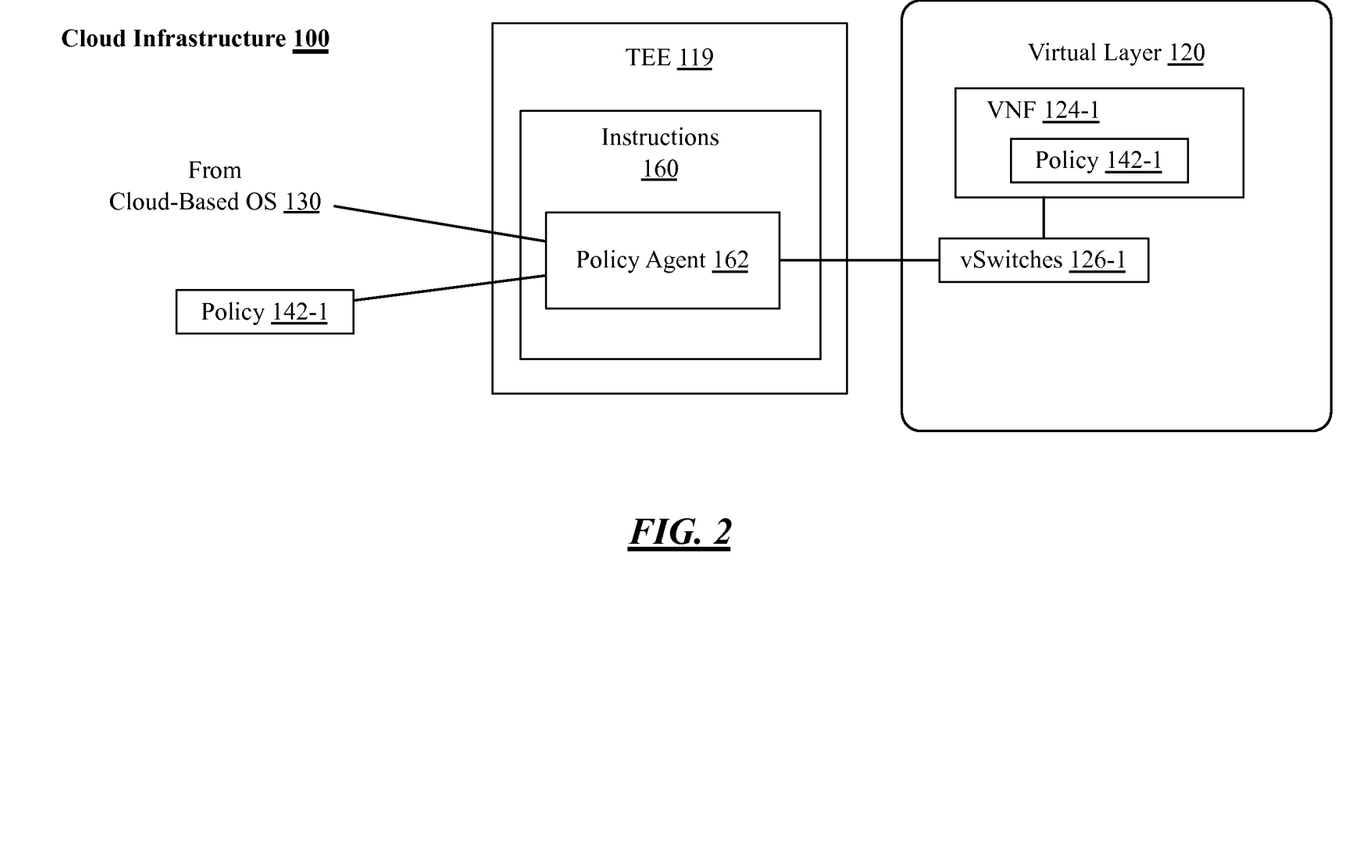
FIGS. 2-7 illustrate example portions of the cloud infrastructure of FIG. 1.
Figure 3:
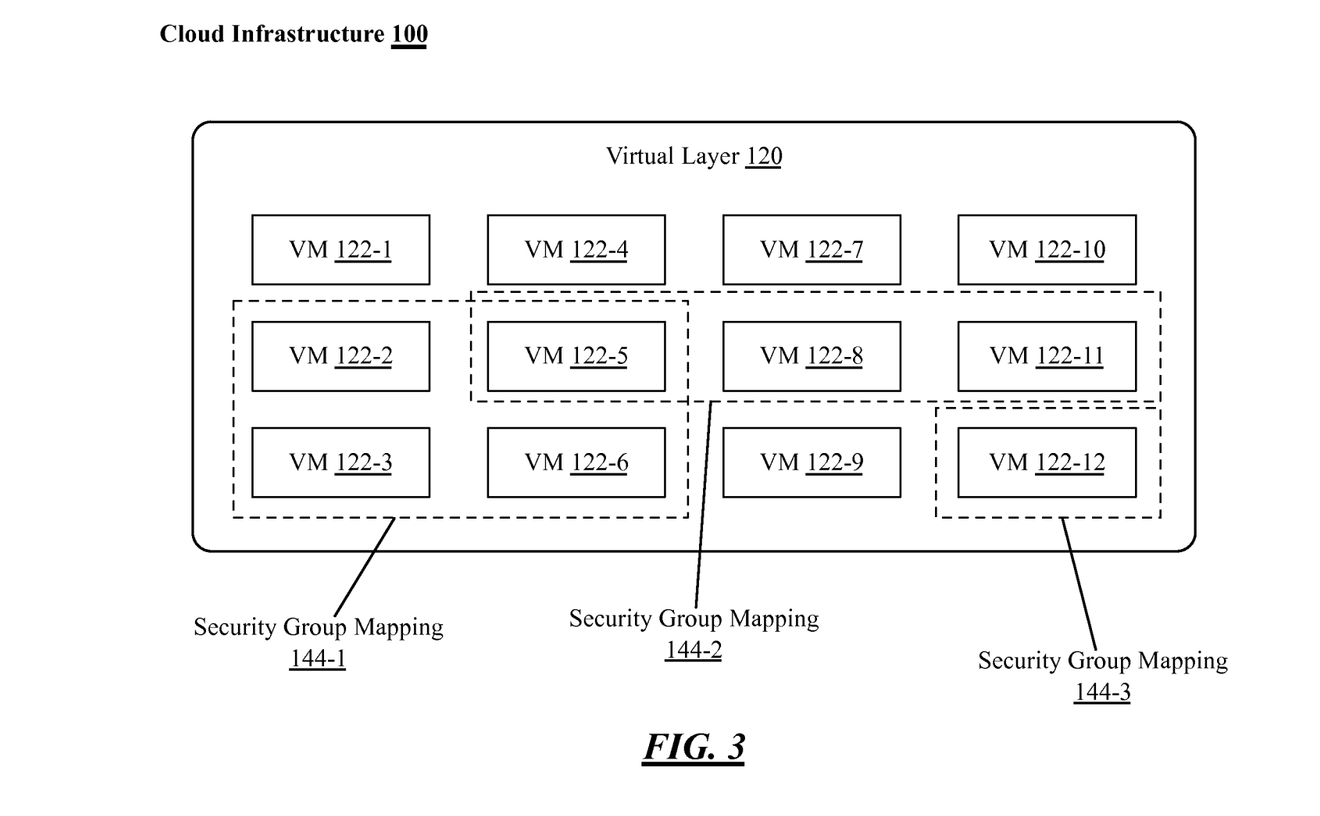
Figure 4:
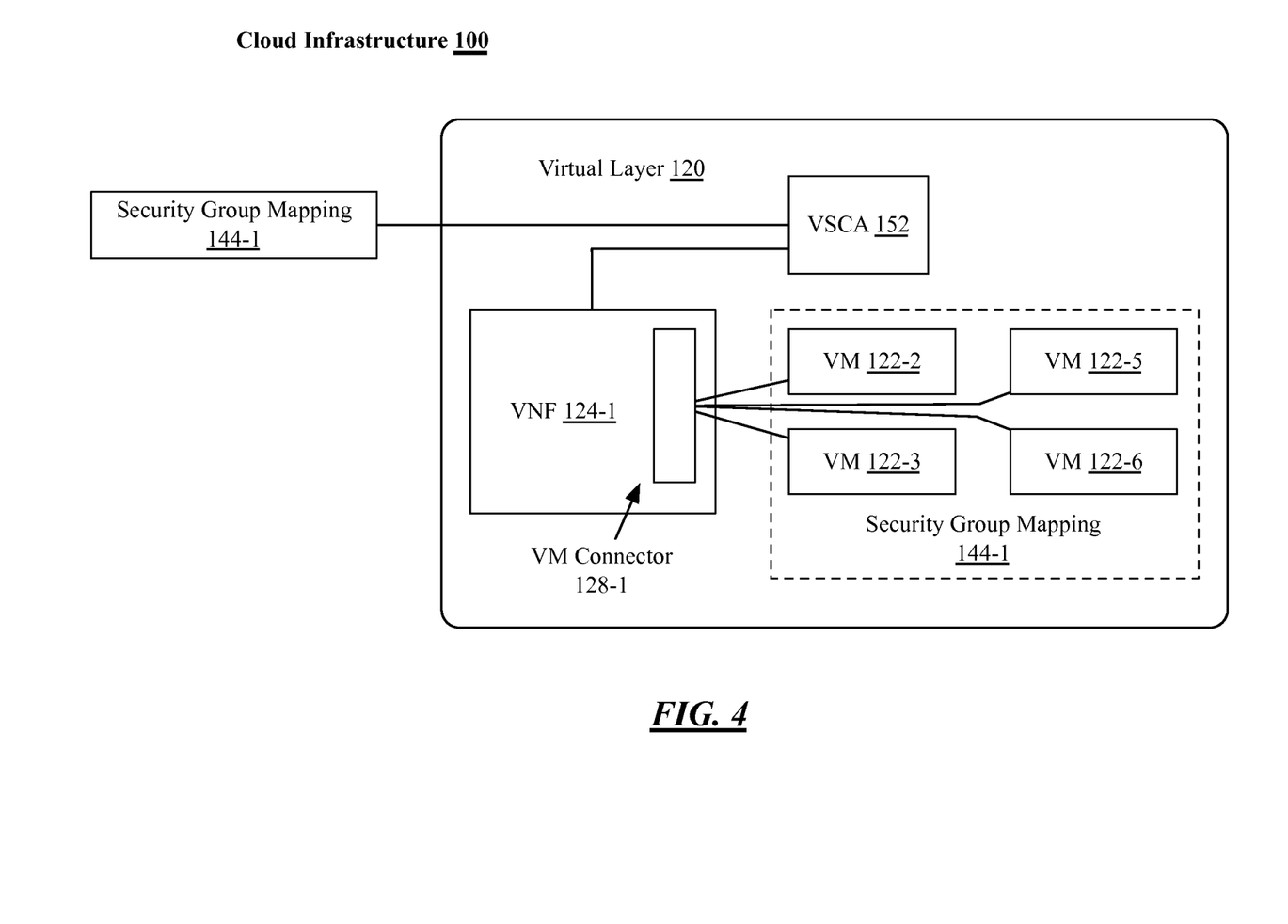
Figure 5:
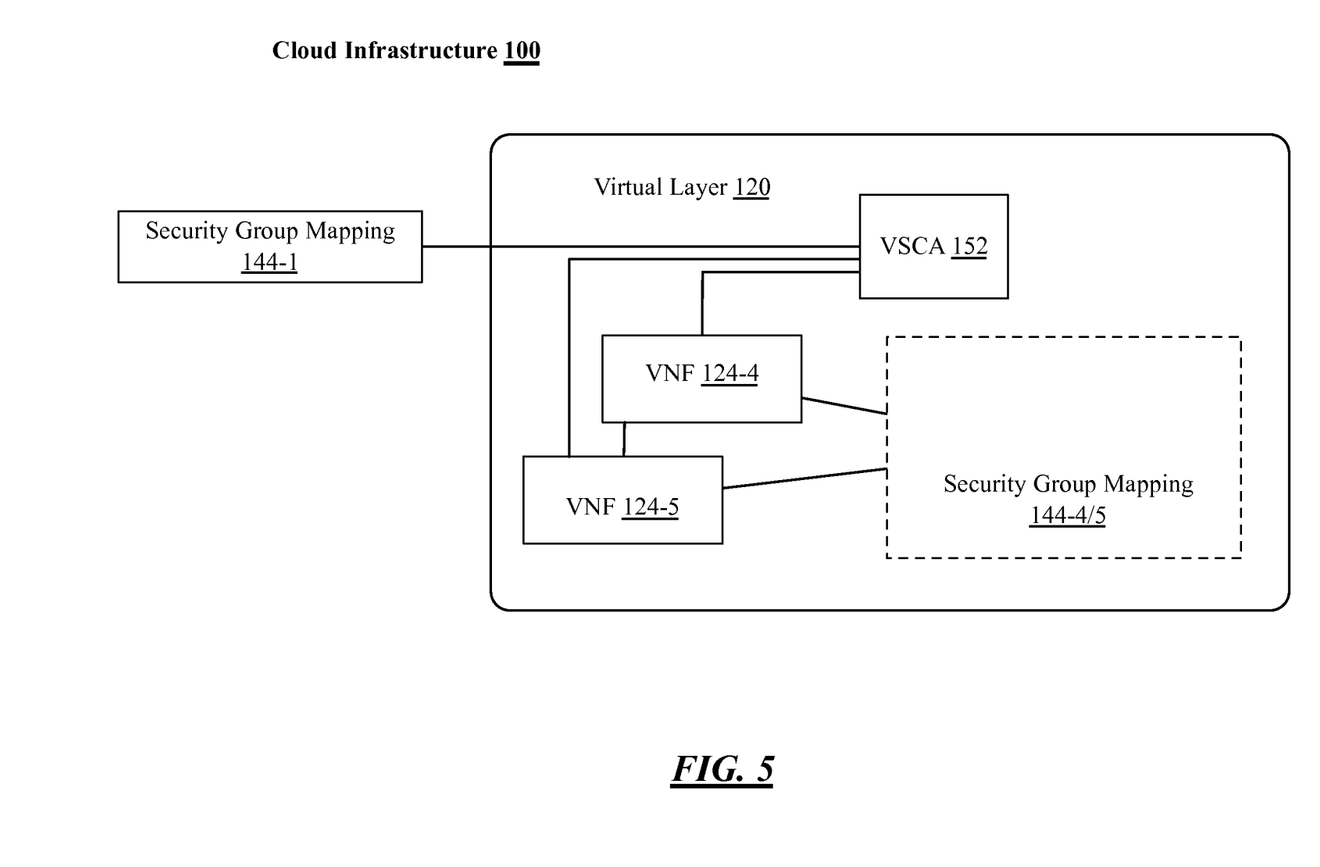
Figure 6:
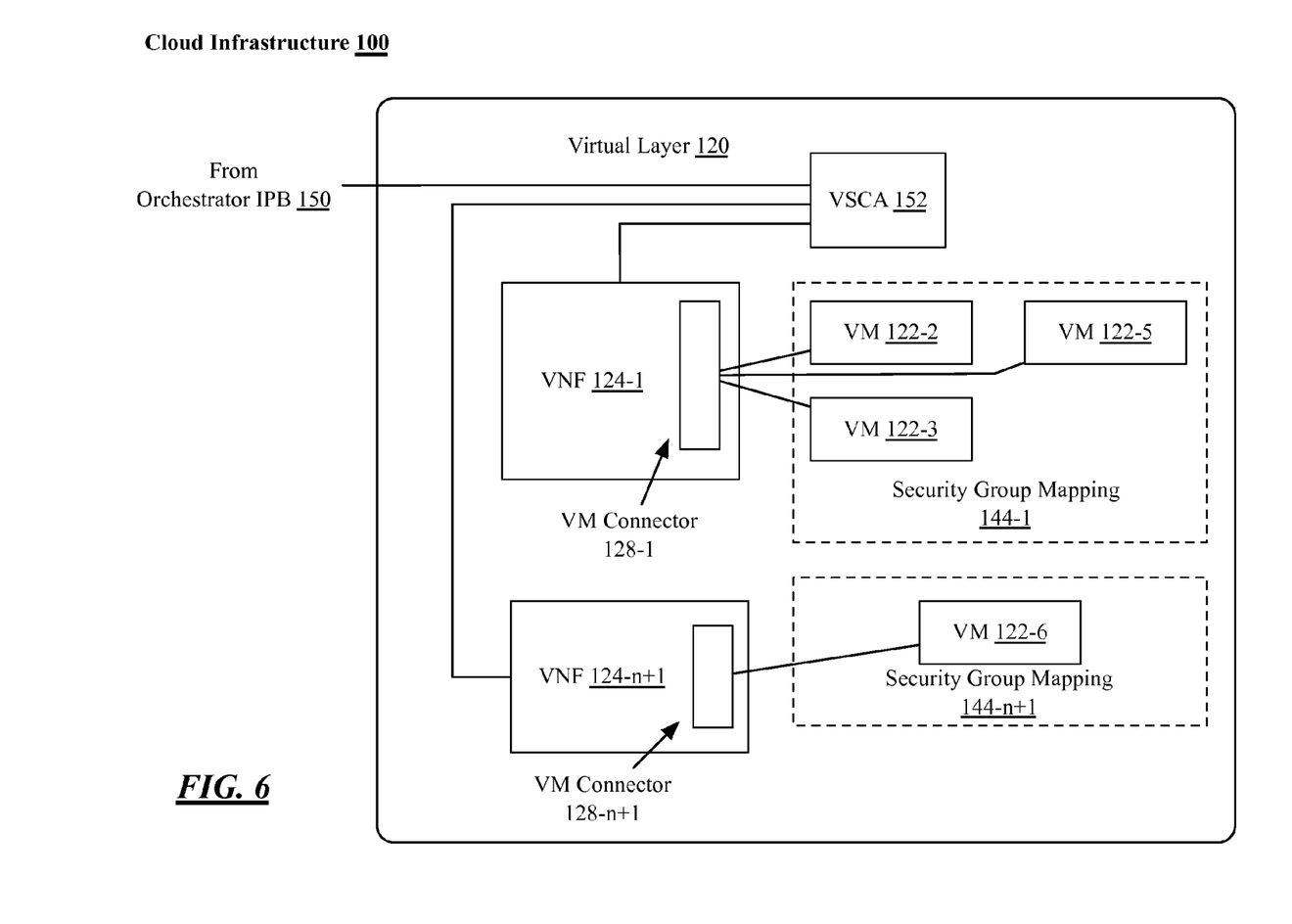
Figure 7:
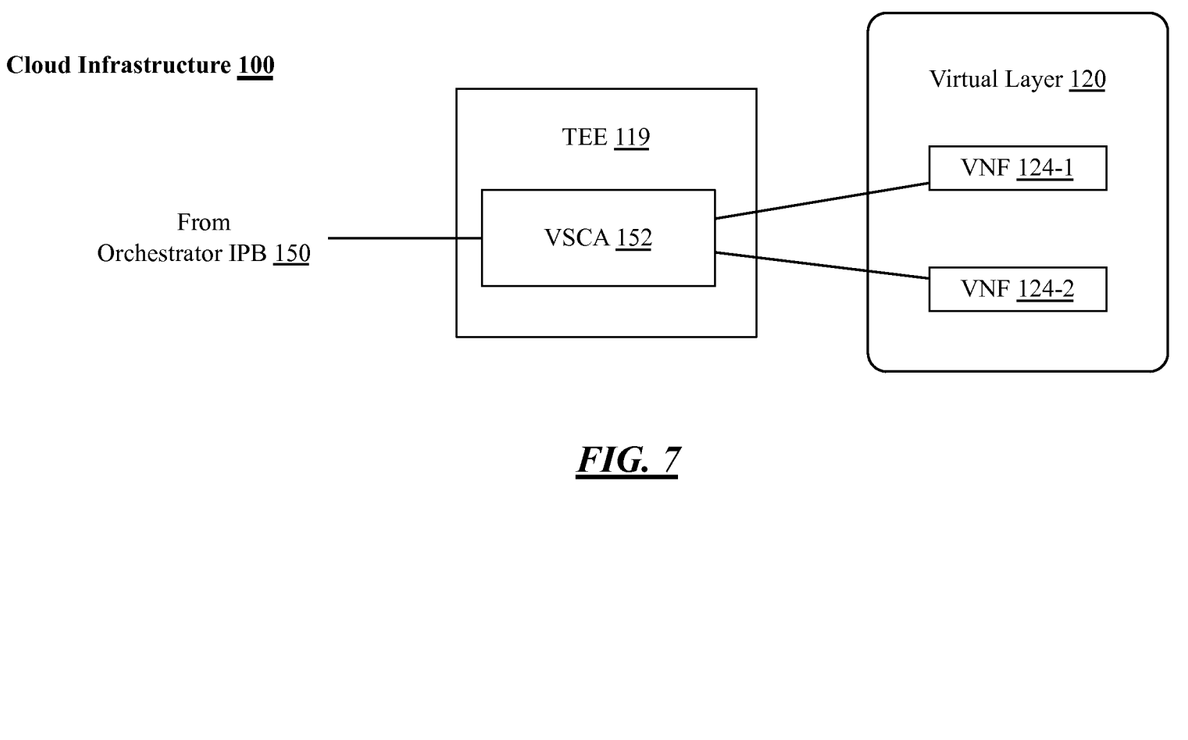

FIGS. 2-7 illustrate examples of portions of the cloud infrastructure 100 of FIG. 1. In general, these figures illustrate example implementations and arrangements of the infrastructure 100 and example operations of portions of the infrastructure 100 in provisioning, configuring, and de-provisioning VNFs. In particular, FIG. 2 illustrates operations of the TEE in executing instructions to configure a VNF with a policy; FIG. 3 illustrates example security group mappings for a number of VMs; FIG. 4 illustrates operations of the orchestrator IPB in provisioning a VNF; FIG. 5 illustrates operations of the orchestrator IPB in provisioning two VNFs to protect a single grouping of VMs; FIG. 6 illustrates operations of the orchestrator IPB moving a VM to an additional security group and provisioning an addition VNF for the added security group; and FIG. 7 illustrates an alternative example of the orchestrator IPB providing an additional VNF.

Furthermore, FIGS. 2-7 illustrate example block diagrams for various apparatus implementable by the infrastructure 100. Although the various apparatus shown in these figures have a limited number of elements in a certain topology, it may be appreciated that the different apparatus may include more or less elements in alternate topologies as desired for a given implementation. According to some examples, the different apparatus may be supported by circuitry (physical and/or virtual) maintained at or with management elements for a system of configurable computing resources of a cloud infrastructure, such as, the physical layer 110, TEE 119, the orchestrator IPB 150, or the like. This circuitry may be arranged to execute one or more software or firmware implemented modules or components (e.g., policy agent 162, VSCA 152, etc.). These "components" may be software/firmware stored in computer-readable media, and although the components are shown in these figures as discrete boxes, this does not limit these components to storage in distinct computer-readable media components (e.g., a separate memory, etc.).

Turning more specifically to FIG. 2, the TEE 119 executing instructions 160 is shown. The instructions 160 may include a policy agent 162. The policy agent 162 may be executed by the TEE 119 to receive a policy from a VNF manager and/or orchestrator IPB and to configure a VNF to implement the policy. More specifically, the policy agent 162 may receive a policy for a particular VNF and may configure the VNF to implement a network function according to the policy. For example, the policy agent may receive the policy 142-1 from the VNF manager 140-1 and may configure the VNF 124-1 to implement the policy 142-1. The policy agent 162 may communicate with the VNF 124-1 to configure the VNF 124-1 through a vSwitch (e.g., the vSwitch 126-1, or the like). In some examples, the vSwitch function may accessed through an embedded management controller, such as IME or IE, or via a host embedded controller interface (HECI), via a virtual network of the cloud-based OS 130, an open virtual switch (oVS), or the like.

With some examples, the policy agent 162 receives the policy 142-1 and validates or authenticates the policy 142-1. For example, the policy agent 162 can verify the source of the policy (e.g., attest that the policy 142-1 is being received from an authorized party, authenticate that the policy 142-1 has been signed by an authorized party, the policy 142-1 has been received directly and has not been tampered with, or the like).

With some examples, the policy agent 162 may monitor the network 132 portion of the cloud-based OS 130 to identify new instances of VNFs 124-1 to 124-n. In particular, the policy agent 162 can receive information from the cloud infrastructure including indications of congestion in the SDN and may provision additional VNFs based on the information.

Turning more specifically to FIG. 3, as noted above, the VMs 122-1 to 122-n may be arranged into security groups such that a particular VNF 124-1 to 124-n may be configured to connect to the VMs in a security group. For example, FIG. 3 illustrates the virtual layer 120 including twelve (12) VMs 122-1 to 122-12. It is noted, that the number of VMs 122 shown is for illustration purposes only and is not intended to be limiting. For example, with some implementations, the number of VMs in a particular virtual layer 120 may be hundreds.

Ones of the VMs 122-1 to 122-12 may be organized in a particular security group and then protected by one of the VNFs 124-1 to 124-n. For example, security group mapping 144-1 is shown including VM 122-2, VM 122-3, VM 122-5, and VM 122-6. Security group mapping 144-2 is shown including VM 122-5, VM 122-8, and VM 122-11. Security group mapping 144-3 is shown including VM 122-12. It is important to note that security group mappings 144 may include any number of VMs (e.g., security group mapping 144-3 includes 1, security group mappings 144-1 and 144-2 include more than 1, etc.). Additionally, it is important to note that security group mappings 144 may overlap with each other. Either partially (e.g., security group mappings 144-1 and 144-2) or entirely (refer to FIG. 5).

Turning more specifically to FIG. 4, the VSCA 152 is shown implemented in the virtual layer 120. As noted, with some examples, the VSCA 152 may be implemented in the TEE 119 (refer to FIG. 7). The VSCA 152 may be executed by the virtual layer 120 and/or the TEE 119. In particular, the VSCA 152 may provision a VNF and connect the VNF to VMs within a security group corresponding to the VNF. The VSCA may instantiate a VNF and generate a VNF connector to connect the VNF to each of the VMs in the security group. For example, the VSCA 152 can instantiate the VNF 124-1 and generate the VM connector 128-1 to connect the VNF 124-1 to the VMs corresponding to security group mapping 144-1. Using the security group mapping examples for FIG. 3, the VM connector 128-1 may communicatively connect each VM 122-2, 122-3, 122-5 and 122-6 to the VNF 124-1. The VM connector 128-1 may be provided such that all communication from each VM within the security group mapping 144-1 is processed through the VNF 124-1. As such, VM to VM communication from within the security group 144-1 will be processed through the VNF 124-1. It is noted, that this may provide an increased level of security. As such, an attack from a VM to another VM in the same security group may be intercepted by the VNF corresponding to that security group.

Turning more specifically to FIG. 5, with some examples, multiple VNFs may be operably connected to a single security group. Said differently, security group mappings may overlap with each other entirely. As such, the VNFs corresponding to the overlapping security groups may be operably connected to the same VMs. For example, VNFs 124-4 and 124-5 may be operably connected to the VMs in security group mappings 144-4 and 144-5.

In some examples, the VNFs may each be communicably coupled to each of the VMs in the security group. In some examples, one of the VNFs may be communicably coupled to each of the VMs in the security group while the other VNFs may be communicatively coupled to the first VNF.

Turning more specifically to FIG. 6, the VSCA 152 may be configured to provision a new VNF and corresponding new security group and move a VM from an existing security group to the new security group. For example, the VSCA 152 may receive an indication that the VNF 124-1 prevented an attack originating from the VM 122-6. As such, the VSCA 152 can quarantine the VM 122-6 by provision a new VNF 124-n+1 and security group 144-n+1. The VSCA 152 can move the VM 122-6 to the new security group 144-n+1. In particular, this may be useful to quarantine a particular VM or VMs and provision VNFs to protect the infrastructure 100 from the VM or VMs in quarantine. For example, the VNF 124-n+1 can be configured with a restrictive policy designed for quarantined VMs.

Turning more specifically to FIG. 7, the VSCA 152 can be implemented to execute within the TEE 119. As illustrated, the VSCA 152 is implemented in the TEE 119 and is provisioning the VNF 124-1 and 124-2. It is to be appreciated, that the VSCA implemented in the virtual layer 120 or the TEE 119 can perform operations described for the VSCA 152.

Various components of TEE 119, orchestrator IPB 150, and virtual layer 120 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces, virtual interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 8:
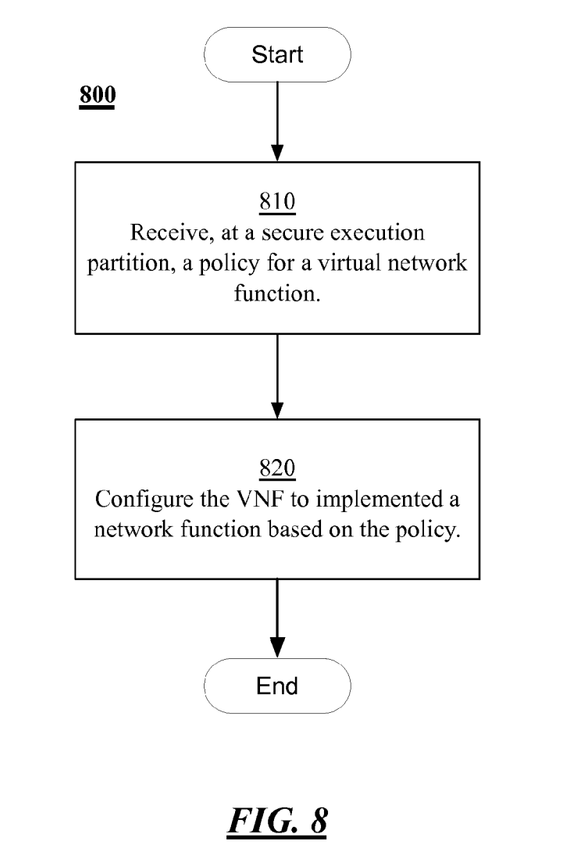
FIGS. 8-9 illustrate example logic flows.
Figure 9:
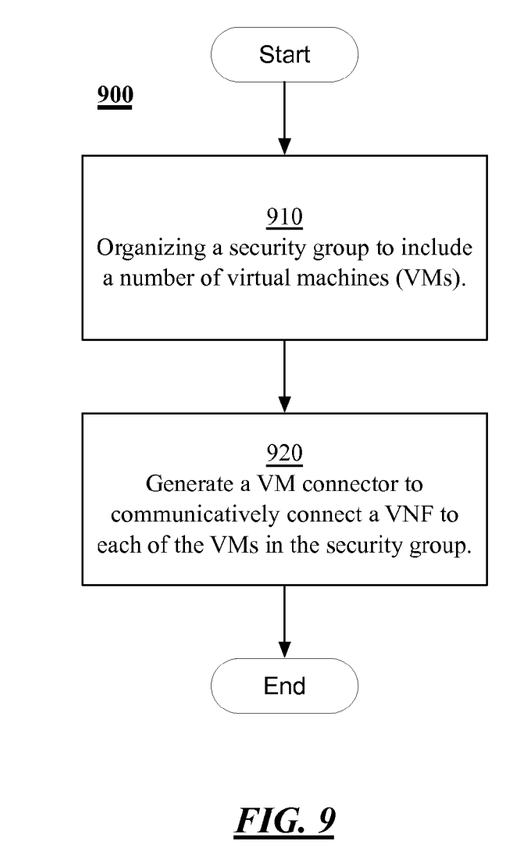

FIGS. 8-9 illustrate example logic flows 800 and 900. Logic flows 800 and 900 may be representative of some or all of the operations executed by one or more logic, features, or devices described herein, such as the policy agent 162 and/or the VSCA 152.

Turning more specifically to FIG. 8, with some examples, logic flow 800 at block 810 may receive, at a secure execution partition, a policy for a virtual network function. For example, the policy agent 162 executing at the TEE 119 may receive a policy for a particular VNF from the VNF manager and/or the orchestrator IPB 150. In particular, the policy agent 162 may receive the policy 142-1 for the VNF 140-1 from the VNF manager 140-1.

In some examples, logic flow 800 at block 820 may configure the VNF to implement a network function based on the policy. For example, the policy agent 162 may configure a VNF to behave according to the policy provided by the VNF manager (e.g., at block 810).

Turning more specifically to FIG. 9, with some examples, logic flow 900 at block 910 may organize a security group to include a number of VMs. For example, the VSCA 152 may organize ones of the VMs into a security group for use with a particular VNF. As a specific example, the VSCA 152 may organize ones of the VMs 122-1 to 122-n into a security group based on security group mapping 144-1 for use with VNF 124-1.

In some examples, logic flow 900 at block 920 may generate a VM connector to communicatively connect a VNF to each of the VMs in the security group. For example, the VSCA 152 may generate the VM connector 128-1 to communicatively connect the VNF 124-1 to each of the VMs in the security group corresponding to the security group mapping 144-1.

Figure 10:
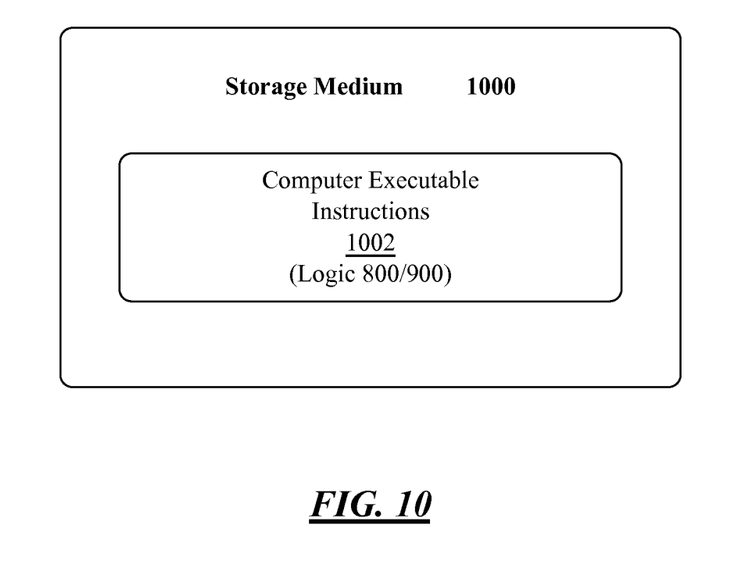
FIG. 10 illustrates an example of a storage medium.

FIG. 10 illustrates an example storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions 1002, such as instructions to implement logic flows 800 and/or 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
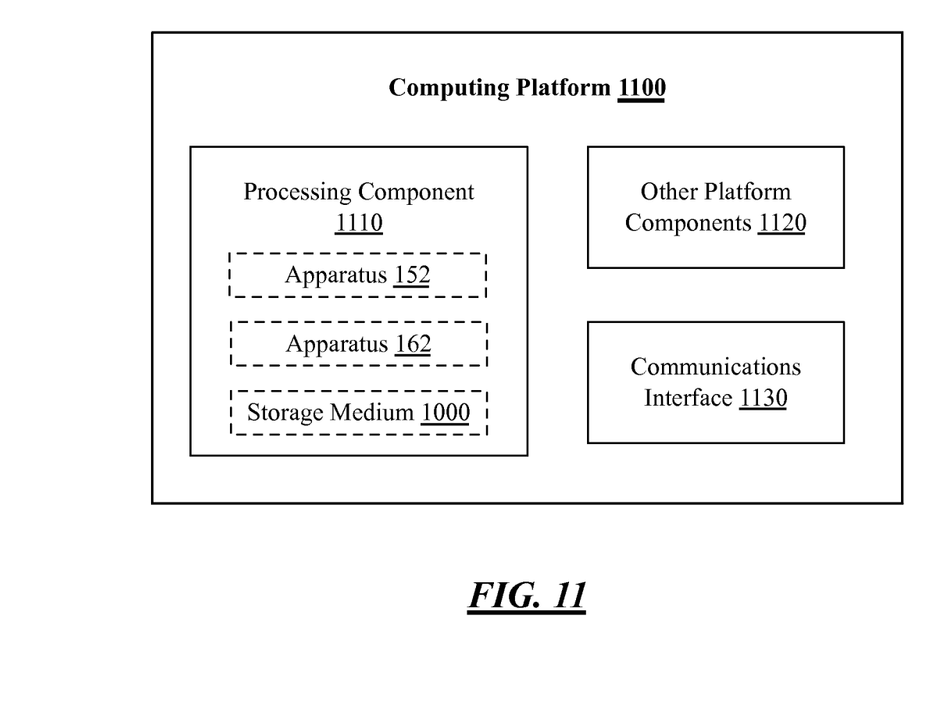
FIG. 11 illustrates an example computing platform.

FIG. 11 illustrates an example computing platform 1100. In some examples, as shown in FIG. 11, computing platform 1100 may include a processing component 1110, other platform components 1120 or a communications interface 1130. According to some examples, computing platform 1100 may host management elements (e.g., policy agent, VSCA, or the like) providing secure provisioning, configuration, and de-provisioning of VNFs for a system of configurable computing resources of a cloud infrastructure such as cloud infrastructure 100 of FIG. 1.

According to some examples, processing component 1110 may execute processing operations or logic for apparatus 152, apparatus 162, and/or storage medium 1000. Processing component 1110 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1120 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1130 may include logic and/or features to support a communication interface. For these examples, communications interface 1860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to Infiniband Architecture specification.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The description now turns to example implementations of the present disclosure.

Example 1

An apparatus comprising: circuitry, the circuitry comprising a secure execution partition; a policy agent for execution by the secure execution partition, the policy agent to receive a policy for a virtual network function (VNF) and to configure the VNF to implement a network function based on the policy.

Example 2

The apparatus of example 1, the policy agent to configure a plurality of VNFs to implement the policy.

Example 3

The apparatus of example 1, the VNF a first VNF and the policy a first policy, the policy agent to receive a second policy for a second VNF and to configure the second VNF to implement a second network function based on the second policy.

Example 3

The apparatus of example 1, the policy agent to configure the VNF via a virtual switch.

Example 4

The apparatus of example 3, wherein the virtual switch comprises a host embedded controller interface or an open virtual switch.

Example 5

The apparatus of example 1, wherein the network function comprises a firewall, an intrusion prevention system, data loss prevention, load balancing, network acceleration, a packet data network gateway, a mobile management entity, or a serving gateway.

Example 6

The apparatus of example 1, wherein the secure execution partition is a trusted execution environment (TEE).

Example 7

The apparatus of example 1, comprising a virtual security control agent (VSCA) for execution by the secure execution partition, the VSCA to organize a security group to include at least one virtual machine (VM).

Example 8

The apparatus of example 7, the VM for execution by the circuitry.

Example 9

The apparatus of example 7, the VSCA to generate a virtual VM connector (VVMC) to communicatively connect the VNF to each of the one or more VMs in the security group.

Example 10

The apparatus of example 7, wherein the security group comprises a first VM and a second VM, the VSCA to move the second VM to a quarantine security group.

Example 11

The apparatus of example 1, comprising: a host memory, the policy agent to monitor the host memory to identify the VNF.

Example 12

The apparatus of example 11, wherein the host memory is a virtual memory partition.

Example 13

A method comprising: receiving, at a secure execution partition, a policy for a virtual network function (VNF); validate the policy; and configuring the VNF to implement a network function based on the policy.

Example 14

The method of example 13, configuring a plurality of VNFs to implement the policy.

Example 15

The method of example 13, wherein the VNF is not functional unless the VNF is configured to implement the policy.

Example 16

The method of example 13, the VNF a first VNF and the policy a first policy, the method comprising: receiving, at the secure execution partition, a second policy for a second VNF; validate the second policy; and configuring the second VNF to implement a second network function based on the second policy.

Example 17

The method of example 13, comprising configuring the VNF via a virtual switch.

Example 18

The method of example 17, wherein the virtual switch comprises a host embedded controller interface or an open virtual switch.

Example 19

The method of example 13, wherein the network function comprises a firewall, an intrusion prevention system, data loss prevention, load balancing, network acceleration, a packet data network gateway, a mobile management entity, or a serving gateway.

Example 20

The method of example 13, wherein the secure execution partition is a trusted execution environment (TEE).

Example 21

The method of example 13, comprising organizing a security group to include at least one virtual machine (VM).

Example 22

The method of example 21, the VM for execution by a cloud infrastructure.

Example 23

The method of example 21, comprising generating a virtual VM connector (VVMC) to communicatively connect the VNF to each of the one or more VMs in the security group.

Example 24

The method of example 21, wherein the security group comprises a first VM and a second VM, the method comprising moving the second VM to a quarantine security group.

Example 25

The method of example 13, comprising monitoring a host memory to identify the VNF.

Example 26

The method of example 25, wherein the host memory is a virtual memory partition.

Example 27

At least one machine readable medium comprising a plurality of instructions that in response to being executed by a secure execution partition of circuitry located with a cloud infrastructure cause the circuitry to carry out a method according to any one of examples 13 to 26.

Example 28

An apparatus comprising means for performing the methods of any one of examples 13 to 26.

Example 29

At least one machine readable medium comprising a plurality of instructions that in response to being executed by a secure execution partition of circuitry located with a cloud infrastructure cause the circuitry to: receive a policy for a virtual network function (VNF); validate the policy; and configure the VNF to implement a network function based on the policy.

Example 30

The at least one machine readable medium of example 29, the instructions to further cause the circuitry to configure a plurality of VNFs to implement the policy.

Example 31

The at least one machine readable medium of example 29, the VNF a first VNF and the policy a first policy, the instructions to further cause the circuitry to: receive a second policy for a second VNF; and configure the second VNF to implement a second network function based on the second policy.

Example 32

The at least one machine readable medium of example 29, the instructions to further cause the circuitry to configure the VNF via a virtual switch.

Example 33

The at least one machine readable medium of example 32, wherein the virtual switch comprises a host embedded controller interface or an open virtual switch.

Example 34

The at least one machine readable medium of example 29, wherein the network function comprises a firewall, an intrusion prevention system, data loss prevention, load balancing, network acceleration, a packet data network gateway, a mobile management entity, or a serving gateway.

Example 35

The at least one machine readable medium of example 29, wherein the secure execution partition is a trusted execution environment (TEE).

Example 36

The at least one machine readable medium of example 29, the instructions to further cause the circuitry to organize a security group to include at least one virtual machine (VM).

Example 37

The at least one machine readable medium of example 36, the VM for execution by the cloud infrastructure.

Example 38

The at least one machine readable medium of example 36, the instructions to further cause the circuitry to generate a virtual VM connector (VVMC) to communicatively connect the VNF to each of the one or more VMs in the security group.

Example 39

The at least one machine readable medium of example 36, wherein the security group comprises a first VM and a second VM, the instructions to further cause the circuitry to move the second VM to a quarantine security group.

Example 40

The at least one machine readable medium of example 29, the instructions to further cause the circuitry to monitor a host memory to identify the VNF.

Example 41

The at least one machine readable medium of example 29, wherein the host memory is a virtual memory partition.

What is claimed is:

1. An apparatus comprising:
 a first processing unit, the first processing unit comprising a secure execution partition, the secure execution partition comprising a partition of circuitry within the first processing unit and wherein the secure execution partition is a circuitry partition which is secured from other partitions within said circuitry; and
 a policy agent executed at the secure execution partition, the policy agent to receive and validate a policy for a virtual network Function (VNF) and to configure the VNF to implement a network function based on the validated policy, the VNF to be executed upon a second processing unit different from the first processing unit.

2. The apparatus of claim 1, the policy agent to configure a plurality of VNFs to implement the policy.

3. The apparatus of claim 1, the VNF a first VNF and the policy a first policy, the policy agent to receive a second policy for a second VNF and to configure the second VNF to implement a second network function based on the second policy.

4. The apparatus of claim 1, the policy agent to configure the VNF via a virtual switch, wherein the virtual switch comprises a host embedded controller interface or an open virtual switch.

5. The apparatus of claim 1, wherein the network function comprises a firewall, an intrusion prevention system, data loss prevention, load balancing, network acceleration, a packet data network gateway, a mobile management entity, or a serving gateway.

6. The apparatus of claim 1, wherein the secure execution partition is a trusted execution environment (TEE) of the first processing unit.

7. The apparatus of claim 1, comprising a virtual security control agent (VSCA) for execution by the secure execution partition, the VSCA to organize a security group to include at least one virtual machine (VM).

8. The apparatus of claim 7, the VM for execution by circuitry different than the secure execution partition.

9. The apparatus of claim 7, the VSCA to generate a virtual VM connector (VVMC) to communicatively connect the VNF to each of the one or more VMs in the security group.

10. The apparatus of claim 7, wherein the security group comprises a first VM and a second VM, the VSCA to move the second VM to a quarantine security group.

11. The apparatus of claim 1, comprising:
 a host memory, the policy agent to monitor the host memory to identify the VNF.

12. The apparatus of claim 11, wherein the host memory is a virtual memory partition.

13. A method comprising:
 receiving, at a secure execution partition of a first processing unit, a policy for a virtual network function (VNF), the secure execution partition comprising a partition of circuitry within the first processing unit and wherein the secure execution partition a circuitry partition which is secured from other partitions within said circuitry; and
 configuring and validating the VNF to implement a network function based on the validated policy the VNF to be executed by a second processing unit different than the first processing unit.

14. The method of claim 13, configuring a plurality of VNFs to implement the policy.

15. The method of claim 13, the VNF a first VNF and the policy a first policy, the method comprising:
 receiving, at the secure execution partition, a second policy for a second VNF; and
 configuring the second VNF to implement a second network function based on the second policy.

16. The method of claim 13, comprising configuring the VNF via a virtual switch.

17. The method of claim 16, wherein the virtual switch comprises a host embedded controller interface or an open virtual switch.

18. The method of claim 13, wherein the network function comprises a firewall, an intrusion prevention system, data loss prevention, load balancing, network acceleration, a packet data network gateway, a mobile management entity, or a serving gateway.

19. The method of claim 13, comprising organizing a security group to include at least one virtual machine (VM).

20. The method of claim 19, comprising generating a virtual VM connector (VVMC) to communicatively connect the VNF to each of the one or more VMs in the security group.

21. The method of claim 19, wherein the security group comprises a first VM and a second VM, the method comprising moving the second VM to a quarantine security group.

22. At least one non-transitory machine readable medium comprising a plurality of instructions that in response to being executed by a secure execution partition of a first processing unit cause the secure execution partition to:
 receive, at the secure execution partition, a policy for a virtual network function (VNF), the secure execution partition comprising a partition of circuitry within the first processing unit and wherein the secure execution partition is a circuitry partition which is secured from other partitions within said circuitry;
 validate the policy; and configure and validating the VNF to implement a network function based on the validated policy, the VNF to be executed by a second processing unit different from the first processing unit.

23. The at least one non-transitory machine readable medium of claim 22, the instructions to further cause the secure execution partition to configure a plurality of VNFs to implement the policy.

24. The at least one non-transitory machine readable medium of claim 22, the VNF a first VNF and the policy a first policy, the instructions to further cause the secure execution partition to:

receive a second policy for a second VNF; and validate the policy; and configure the second VNF to implement a second network function based on the second policy.

25. The at least one non-transitory machine readable medium of claim 22, wherein the network function comprises a firewall, an intrusion prevention system, data loss prevention, load balancing, or network acceleration, a packet data network gateway, a mobile management entity, or a serving gateway.

* * * * *